US011239465B2

(12) United States Patent
Lee et al.

(10) Patent No.: US 11,239,465 B2
(45) Date of Patent: Feb. 1, 2022

(54) SULFUR-CARBON COMPOSITE, PREPARATION METHOD THEREFOR, AND LITHIUM-SULFUR BATTERY COMPRISING SAME

(71) Applicant: LG CHEM, LTD., Seoul (KR)

(72) Inventors: Dongwook Lee, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 218 days.

(21) Appl. No.: 16/304,806

(22) PCT Filed: May 26, 2017

(86) PCT No.: PCT/KR2017/005526
§ 371 (c)(1),
(2) Date: Nov. 27, 2018

(87) PCT Pub. No.: WO2018/030616
PCT Pub. Date: Feb. 15, 2018

(65) Prior Publication Data
US 2020/0235394 A1 Jul. 23, 2020

(30) Foreign Application Priority Data
Aug. 11, 2016 (KR) .......................... 10-2016-0102180

(51) Int. Cl.
*H01M 4/58* (2010.01)
*H01M 4/04* (2006.01)
(Continued)

(52) U.S. Cl.
CPC ....... *H01M 4/5815* (2013.01); *H01M 4/0471* (2013.01); *H01M 4/133* (2013.01);
(Continued)

(58) Field of Classification Search
CPC .... H01M 4/1393; H01M 4/0471; H01M 4/38; H01M 4/5815; H01M 4/1397;
(Continued)

(56) References Cited

U.S. PATENT DOCUMENTS

2009/0001326 A1*  1/2009  Sato ........................ B82Y 40/00
                                                              252/511
2011/0206992 A1    8/2011  Campbell et al.
(Continued)

FOREIGN PATENT DOCUMENTS

CN  103199250 B   8/2015
CN  105374998 A   3/2016
(Continued)

OTHER PUBLICATIONS

European Search Report for Appl. No. 17839634.7 dated Jun. 27, 2019.
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A sulfur-carbon composite including a carbon-based material of which surface is modified by acid treatment is provided, as well as a method for preparing the same, and a lithium-sulfur battery including the same. A sulfur-carbon composite suppresses polysulfide elution when used as a positive electrode active material of a lithium-sulfur battery by including a carbon-based material of which surface is modified to have a hydroxyl group and a carboxyl group capable of adsorbing polysulfide on the surface. Accordingly, capacity property and life time property of the battery may be enhanced. In addition, a surface of the carbon-based material can be modified using a simple process of treating
(Continued)

with a mixed solution of nitric acid and sulfuric acid, and a content of functional groups on the surface can be controlled depending on a mixing ratio of the nitric acid and the sulfuric acid.

9 Claims, 3 Drawing Sheets

(51) Int. Cl.
| | |
|---|---|
| *H01M 4/133* | (2010.01) |
| *H01M 4/136* | (2010.01) |
| *H01M 4/1393* | (2010.01) |
| *H01M 4/1397* | (2010.01) |
| H01M 10/0525 | (2010.01) |
| H01M 4/587 | (2010.01) |
| H01M 4/36 | (2006.01) |
| H01M 10/052 | (2010.01) |
| H01M 4/38 | (2006.01) |

(52) U.S. Cl.
CPC ......... *H01M 4/136* (2013.01); *H01M 4/1393* (2013.01); *H01M 4/1397* (2013.01); H01M 4/362 (2013.01); H01M 4/38 (2013.01); H01M 4/587 (2013.01); H01M 10/052 (2013.01); H01M 10/0525 (2013.01)

(58) Field of Classification Search
CPC ...... H01M 4/136; H01M 4/587; H01M 4/362; H01M 10/052; H01M 10/0525; H01M 4/133
USPC ...................................................... 429/218.1
See application file for complete search history.

(56) References Cited

U.S. PATENT DOCUMENTS

| | | | |
|---|---|---|---|
| 2012/0119161 A1 | 5/2012 | Son et al. | |
| 2013/0164625 A1* | 6/2013 | Manthiram | H01M 4/13 429/231.8 |
| 2013/0171339 A1 | 7/2013 | Wang et al. | |
| 2013/0337317 A1 | 12/2013 | Shima et al. | |
| 2014/0099536 A1 | 4/2014 | Sun et al. | |
| 2014/0234702 A1 | 8/2014 | Zhang et al. | |
| 2015/0064538 A1* | 3/2015 | Bosnyak | H01M 4/622 429/144 |
| 2015/0084603 A1 | 3/2015 | Thillaiyan et al. | |
| 2015/0155549 A1 | 6/2015 | Moganty et al. | |
| 2015/0325850 A1* | 11/2015 | Jang | H01M 4/38 427/122 |
| 2015/0340696 A1 | 11/2015 | Son et al. | |
| 2016/0141620 A1 | 5/2016 | Cairns et al. | |
| 2016/0190558 A1 | 6/2016 | Niu et al. | |
| 2018/0002179 A1* | 1/2018 | Okamoto | C01B 32/05 |
| 2018/0159133 A1* | 6/2018 | Schoo | H01M 10/0436 |
| 2018/0166737 A1* | 6/2018 | Tomar | H01M 4/625 |
| 2018/0183041 A1* | 6/2018 | Tour | H01M 10/052 |

FOREIGN PATENT DOCUMENTS

| | | |
|---|---|---|
| CN | 104786967 A | 7/2016 |
| EP | 1 117 141 A1 | 7/2001 |
| JP | 2013-139377 A | 7/2013 |
| JP | 2013-212975 A | 10/2013 |
| JP | 2014-511548 A | 5/2014 |
| KR | 10-2001-0073177 A | 7/2001 |
| KR | 10-2004-0110863 A | 12/2004 |
| KR | 10-2012-0051549 A | 5/2012 |
| KR | 10-2012-0133643 A | 12/2012 |
| KR | 10-2013-0107071 A | 10/2013 |
| KR | 10-1379716 B1 | 3/2014 |
| KR | 10-1398313 B1 | 5/2014 |
| KR | 10-2014-0084840 A | 7/2014 |
| KR | 10-2014-0090109 A | 7/2014 |
| KR | 10-1530963 B1 | 6/2015 |
| KR | 10-2016-0021848 A | 2/2016 |
| WO | WO 2012/115119 A1 | 8/2012 |

OTHER PUBLICATIONS

Ji, L., et al, "Graohene Oxide as a Sulfur Immobilizer in High Performance Lithium/Sulfur Cells," J. Am. Chem. Soc., Nov. 23, 2011, vol. 133, No. 46, pp. 18522-18525.

Xu, J., et al, "Sulfur-Graphene Nanostructured Cathodes via Ball-Milling for High-Performance Lithium-Sulfur Batteries," ACS Nano, Oct. 28, 2014, vol. 8, No. 10, pp. 10920-10930.

Chen et al., "A hierarchical architecture S/MWCNT nanomicrosphere with large pores for lithium sulfur batteries", Phys. Chem. Chem. Phys., 2012, vol. 14, pp. 5376-5382.

International Search Report for PCT/KR2017/005526 dated Sep. 12, 2017.

Yan et al., "Long-life, high-efficiency lithium/sulfur batteries from sulfurized carbon nanotube cathodes", Journal of Materials Chemistry A, 2015, vol. 3, pp. 10127-10133.

Yan et al., "Long-Life, High-Efficiency Lithium-Sulfur Battery from a Nanoassembled Cathode". Chem. Mater. 2015, vol. 27, pp. 5080-5087.

"Selection Technology of Plastic Materials", China Light Industry Press, Jan. 2008, pp. 132-136, with English translation.

* cited by examiner

【Figure 1】
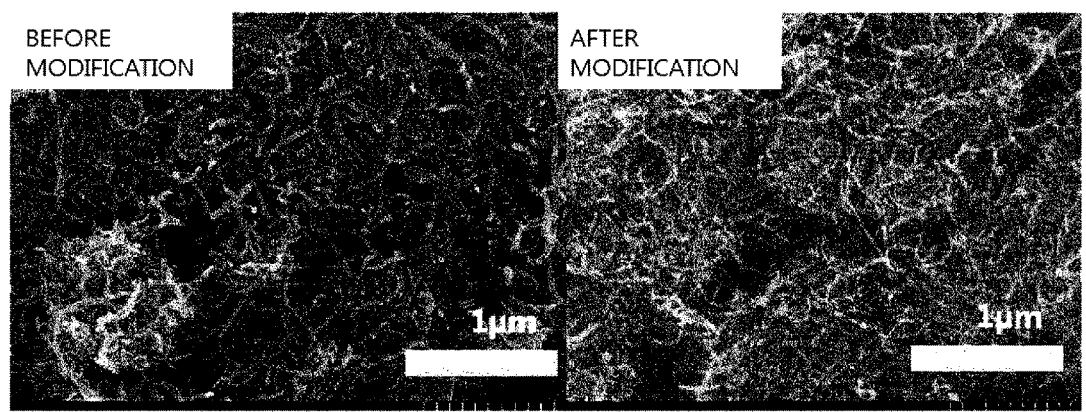
【Figure 2】
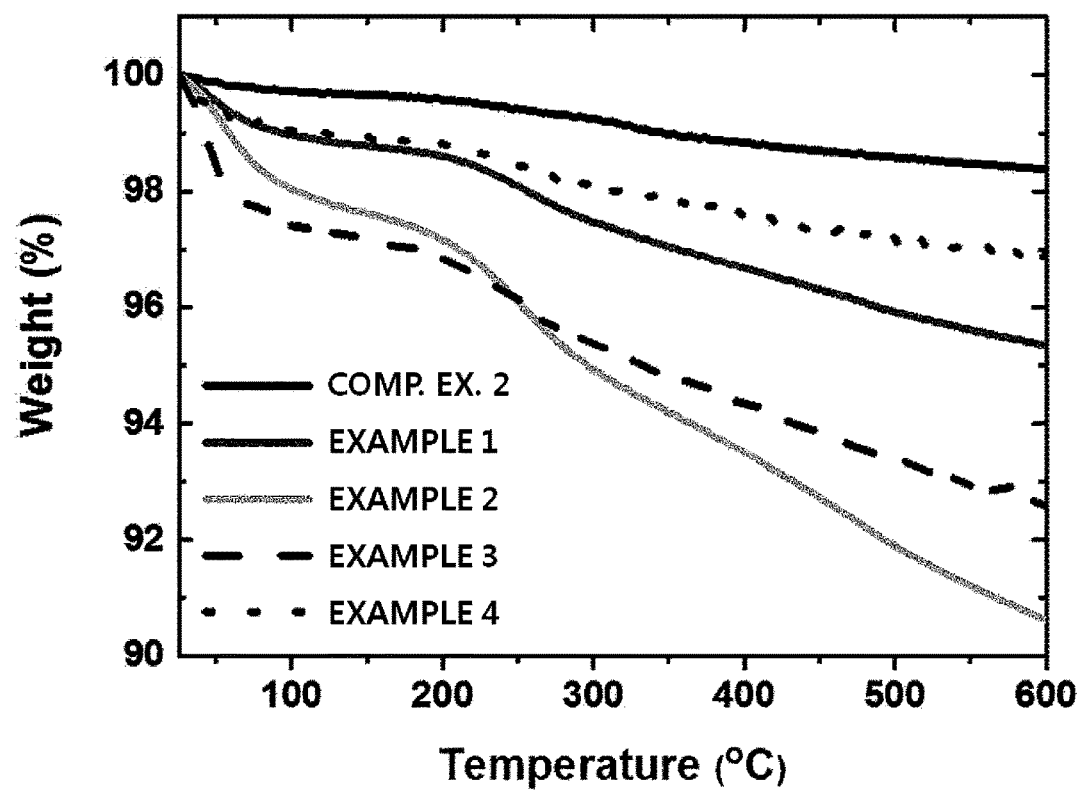

【Figure 3】
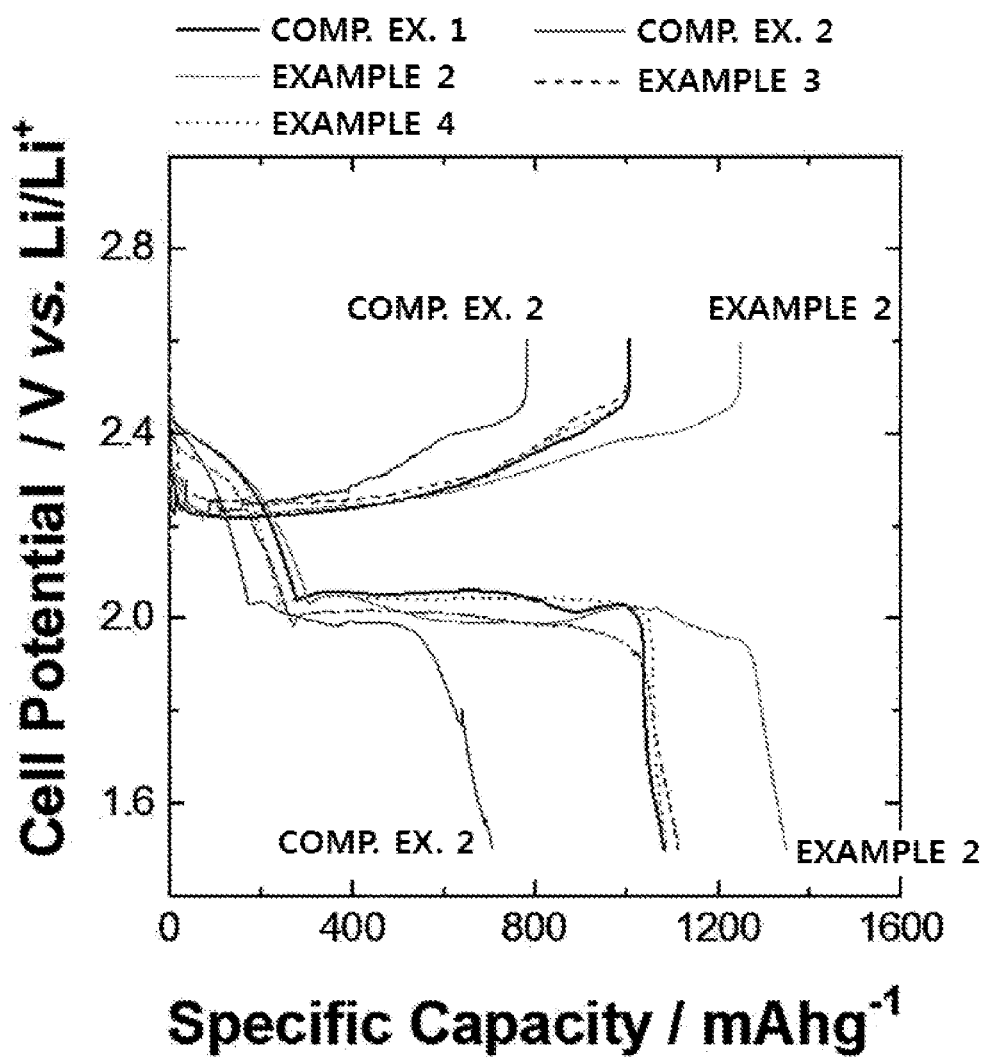

【Figure 4】
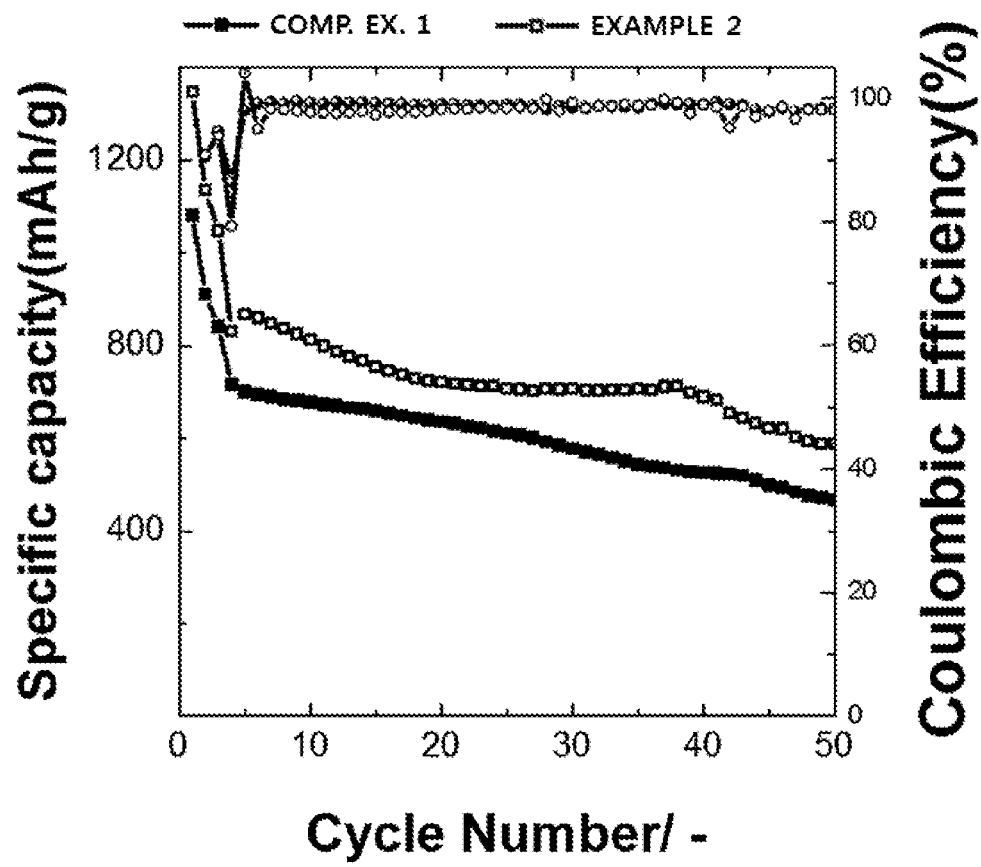

SULFUR-CARBON COMPOSITE, PREPARATION METHOD THEREFOR, AND LITHIUM-SULFUR BATTERY COMPRISING SAME

TECHNICAL FIELD

This application claims priority to and the benefits of Korean Patent Application No. 10-2016-0102180, filed with the Korean Intellectual Property Office on Aug. 11, 2016, the entire contents of which are incorporated herein by reference.

The present invention relates to a sulfur-carbon composite including a carbon-based material of which surface is modified by acid treatment, a method for preparing the same, and a lithium-sulfur battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—$MnO_2$ battery: 1,000 Wh/kg, Na—S battery: 800 Wh/kg), and therefore, has received attention as a battery having a high energy density property.

Sulfur is used as a positive electrode active material of a lithium-sulfur battery, however, sulfur is a nonconductor and migration of electrons produced from an electrochemical reaction is difficult, and therefore, a sulfur-carbon composite compositing sulfur with carbon, a conductive material, is generally used in order to compensate the nonconductor property.

However, a simple sulfur-carbon composite has a problem that lithium polysulfide, which is an intermediate, is eluted during a battery reaction, resulting in active material loss. Apart from floating or being immersed in a liquid electrolyte, lithium polysulfide eluted as above directly reacts with lithium and is fixed on a negative electrode surface in a $Li_2S$ form, and causes a problem of corroding the negative electrode of the lithium metal.

Such lithium polysulfide elution adversely affects capacity retention rate and life time properties of a battery, and accordingly, various attempts for suppressing lithium polysulfide elution have been made. As one example, Korean Patent No. 1379716 discloses a method for preparing a lithium sulfur-carbon composite by treating graphene with hydrofluoric acid to form holes on the graphene surface, and growing sulfur particles in the holes. However, the method has a problem in that material costs are high and the process is complex, which is not suitable for processing.

In addition thereto, a method of adding an additive having a property of adsorbing sulfur to a positive electrode mixture has been disclosed, however, there are problems in that the additive used herein is a high-priced material such as transition metal chalcogenides not suitable for commercialization, and the positive electrode weight inevitably increases due to the addition of the additive, and capacity for unit weight is difficult to increase.

Accordingly, in order to commercialize a lithium-sulfur battery, development of a sulfur-carbon composite using a simple process and at low preparation costs while resolving a problem of lithium polysulfide elution has been required so that mass production will be possible.

PRIOR ART DOCUMENT

Korean Patent No. 1379716, lithium-sulfur secondary battery having electrode which is constructed with graphene composite including sulfur and a forming method thereof

DISCLOSURE

Technical Problem

In view of the above, the inventors of the present invention have prepared a sulfur-carbon composite by modifying a surface of a carbon-based material using an aqueous solution mixing nitric acid and sulfuric acid, and then compositing the result with sulfur, and have identified that the sulfur-carbon composite prepared as above exhibits excellent electrical conductivity and lithium polysulfide elution suppressing effect when used as a positive electrode active material of a lithium-sulfur battery.

Accordingly, an aspect of the present invention provides a sulfur-carbon composite.

Another aspect of the present invention provides a method for preparing a sulfur-carbon composite.

Another aspect of the present invention provides an electrode including the sulfur-carbon composite as an active material, and a lithium-sulfur battery including the electrode.

Technical Solution

According to an aspect of the present invention, there is provided a sulfur-carbon composite including a carbon-based material of which surface is modified with a hydroxyl group and a carboxyl group, and sulfur, wherein a content of the hydroxyl group and the carboxyl group is from 3% to 10% by weight based on a total weight of the carbon-based material, an electrode for a lithium-sulfur battery including the same, and a lithium-sulfur battery including the electrode.

Herein, the carbon-based material may be at least one selected from the group consisting of carbon nanotubes, graphene, graphite, amorphous carbon, carbon black, and active carbon.

Herein, in the sulfur-carbon composite, a ratio of the carbon-based material and the sulfur may be from 1:1 to 1:9.

Herein, the sulfur-carbon composite may have a diameter of 0.1 μm to 20 μm.

According to another aspect of the present invention, there is provided a method for preparing a sulfur-carbon composite including S1) preparing a surface-modified carbon-based material by treating a carbon-based material with a mixed solution of nitric acid and sulfuric acid, or sulfuric acid; S2) drying the surface-modified carbon-based material; and S3) preparing a sulfur-carbon composite by compositing the dried surface-modified carbon-based material with sulfur powder, wherein the surface-modified carbon-based material of S1 has a hydroxyl group and a carboxyl group on a surface thereof, and a content of the hydroxyl group and the carboxyl group is from 3% by weight to 10% by weight of the carbon-based material.

Herein, the mixed solution of S1 may be a solution mixing a 70% aqueous nitric acid solution and sulfuric acid in a volume ratio of 1:1 to 0:1.

Herein, in S1, the mixed solution may be added in 50 ml to 150 ml per 1 g of the carbon-based material.

Herein, S1 may be carried out by ultrasonication.

Herein, S1 may be carried out at 90° C. to 120° C.

Advantageous Effects

A sulfur-carbon composite according to the present invention suppresses polysulfide elution when used as a positive electrode active material of a lithium-sulfur battery by including a carbon-based material of which surface is modified to have a hydroxyl group and a carboxyl group capable of adsorbing polysulfide on the surface. Accordingly, battery capacity property and life time property can be enhanced.

In addition, by using a method for preparing a sulfur-carbon composite according to the present invention, a surface of the carbon-based material can be modified using a simple process of treating with a mixed solution of nitric acid and sulfuric acid, and a content of functional groups on the surface can be controlled depending on a mixing ratio of the nitric acid and the sulfuric acid.

DESCRIPTION OF DRAWINGS

FIG. 1 shows SEM images of a carbon nanotube surface before surface modification and after surface modification.

FIG. 2 is a thermogravimetric analysis (TGA) graph of surface-modified carbon nanotubes prepared in Comparative Example 2 and Examples 1 to 4.

FIG. 3 is a charge and discharge graph of batteries manufactured using sulfur-carbon composites of Comparative Examples 1 and 2 and Examples 2 to 4 as a positive electrode active material.

FIG. 4 is a graph showing a capacity retention property of batteries manufactured using sulfur-carbon composites of Example 2 and Comparative Example 1 as a positive electrode active material.

BEST MODE

Hereinafter, embodiments of the present invention will be described in detail with reference to the accompanying drawings so that those skilled in the art may readily implement the present invention. However, the present invention may be implemented in various different forms, and is not limited to the embodiments described herein.

In the present specification, "polysulfide" is a concept including both "polysulfide ions ($S_x^{2-}$, x=8, 6, 4, 2)" and "lithium polysulfide ($Li_2S_x$ or $LiS_x^-$ x=8, 6, 4, 2)".

Sulfur-Carbon Composite

The present invention provides a sulfur-carbon composite including a carbon-based material of which surface is modified with a hydroxyl group and a carboxyl group, and sulfur, wherein the hydroxyl group and the carboxyl group is included in 3% to 10% by weight based on a total weight of the carbon-based material.

The sulfur-carbon composite of the present invention includes sulfur that is a nonconductor, and a carbon-based material having electrical conductivity, and is capable of being used as a positive electrode active material for a lithium-sulfur battery.

A lithium-sulfur battery produces electric energy using an oxidation-reduction reaction in which an oxidation number of S decreases as sulfur-sulfur bonds of a sulfur series compound are broken during discharge, and an oxidation number of S increases as S—S bonds are formed again during charge.

During such charge and discharge of a lithium-sulfur battery, polysulfide, an intermediate, is produced in a positive electrode, and this is a highly polar material and is readily dissolved in an electrolyte having polarity. The polysulfide dissolved in an electrolyte is diffused outside the positive electrode reaction area causing a decrease in the battery capacity, which resultantly leads to a decrease in the battery life.

In the present invention, a problem of polysulfide elution is resolved by using a carbon-based material having its surface modified to have a hydroxyl group and a carboxyl group as a carbon material of the sulfur-carbon composite. The hydroxyl group and the carboxyl group having polarity interact with polar polysulfide suppressing polysulfide loss out of the positive electrode region, and therefore, availability of the active material may increase and a decrease in the battery life may be prevented. In addition, additional additives are not required, and an electrode having high capacity per unit weight may be prepared.

As the carbon-based material capable of being used in the sulfur-carbon composite of the present invention, those capable of providing conductivity to sulfur, a nonconductor, and having functional groups of a hydroxyl group and a carboxyl group on the surface by acid treatment are used. Specifically, the carbon-based material may be at least one selected from the group consisting of carbon nanotubes, graphene, graphite, amorphous carbon, carbon black and active carbon. Among these, carbon nanotubes, graphite and carbon black are more preferred in terms of having excellent electrical conductivity, specific surface area and sulfur loading.

The carbon nanotubes (CNT) may be single-walled carbon nanotubes (SWCNT) or multi-walled carbon nanotubes (MWCNT). The CNT diameter is preferably from 1 nm to 200 nm, more preferably from 1 nm to 100 nm, and most preferably from 1 nm to 50 nm. When the CNT diameter is greater than 200 nm, the specific surface area decreases causing a problem of reducing a reaction area with a liquid electrolyte.

As the graphite, one or more of artificial graphite and natural graphite may be used. Examples of the natural graphite may include flake graphite, high crystalline graphite, amorphous (microcrystalline or cryptocrystalline) graphite and the like, and examples of the artificial graphite may include primary or electrographite, secondary graphite, graphite fiber and the like. As the graphite particles, the graphite type described above may be used either alone as one type, or as a combination of two or more types.

The graphite particles are not particularly limited in the crystal structure as long as they are capable of reversibly intercalating and deintercalating lithium ions during charge and discharge. For example, the graphite particles may have surface spacing of greater than or equal to 0.335 nm and less than 0.337 nm, for example, greater than or equal to 0.335 nm and less than 0.337 nm obtained by X-ray wide angle diffraction.

In addition, the graphite particles preferably have equal or smaller sizes compared to silicon-based particles in terms of enhancing mixing uniformity and mixture density. For example, the graphite particles may have an average particle diameter of 20 μm or less, specifically, for example, 0.1 μm to 20 μm or less, and more specifically, 0.1 μm to 10 μm, 1 μm to 10 μm, or 1 μm to 5 μm.

Examples of the carbon black may include one or more selected from the group consisting of acetylene black, ketjen black, furnace black, oil-furnace black, Columbia carbon, channel black, lamp black and thermal black. Particle sizes of such carbon black are not limited, however, having an average particle diameter of 0.01 μm to 0.5 μm is preferred in terms of securing a reaction area with a liquid electrolyte.

The carbon-based material may be used as a material of the composite after being oxidized using known methods so as to have a hydroxyl group and a carboxyl group on the surface. Such an oxidation method is not particularly limited, but preferably follows a method for preparing a sulfur-carbon composite according to the present invention to be described below. The method for preparing a sulfur-carbon composite according to the present invention is capable of modifying a surface of the carbon-based material at low costs and through a simple process using a mixed solution of nitric acid and sulfuric acid, and may control the content of surface functional groups of the carbon-based material by adjusting a ratio of the nitric acid and the sulfuric acid.

The surface-modified carbon-based material preferably has a surface functional group content of 3% to 10% by weight, and more preferably 5% to 10% by weight. As the content of the surface functional groups of the carbon-based material increases, the polysulfide adsorption ability is excellent and the utilization of the active material can be improved. However, when the content is greater than 10% by weight, electrical conductivity of the carbon material decreases making it difficult to secure conductivity of the sulfur-carbon composite. Therefore, the content is properly controlled within the above-mentioned range.

Herein, the content of the surface functional groups may be measured using known methods, and as one example, may be measured by thermogravimetric analysis (TGA).

The surface-modified carbon-based material described above is mixed with sulfur to be used as a sulfur-carbon composite.

Herein, inorganic sulfur or elemental sulfur ($S_8$) is preferred as the sulfur used.

In the sulfur-carbon composite according to the present invention, the carbon-based material and the sulfur is preferably mixed in a weight ratio of 1:1 to 1:9. When the carbon-based material content is greater than the above-mentioned range, the content of the sulfur, an active material, decreases causing a problem in securing battery capacity, and when the content is less than the above-mentioned range, the carbon-based material content becomes insufficient to provide electrical conductivity, and therefore, the content is properly controlled within the above-mentioned range.

The method of compositing the sulfur-carbon composite of the present invention is not particularly limited in the present invention, and methods commonly used in the art may be used. As one example, a method of simply mixing the surface-modified carbon-based material and sulfur, and then compositing the result through heat treatment may be used.

In the sulfur-carbon composite provided in the present invention, sulfur and the surface-modified carbon-based material provided above may be composited through simple mixing, or the composite may have a core-shell structured coating form or a loaded form. The core-shell structured coating form is a form in which any one of the sulfur or the carbon-based material coats the other, and as one example, the carbon-based material surface may be covered by sulfur, or it may be the opposite thereof. In addition, the loaded form may be a form in which sulfur is loaded inside the carbon-based material when it is porous. As the form of the sulfur-carbon composite, any form may be used as long as it satisfies the content ratio of the sulfur and the carbon-based material provided above, and the form is not limited in the present invention.

The diameter of such a sulfur-carbon composite is not particularly limited in the present invention and may vary, however, is preferably from 0.1 μm to 20 μm and more preferably from 1 μm to 10 μm. Satisfying the above-mentioned range has an advantage in that a high loading electrode may be manufactured.

Method for Preparing Sulfur-Carbon Composite

The present invention provides a method for preparing a sulfur-carbon composite including S1) preparing a surface-modified carbon-based material by treating a carbon-based material with a mixed solution of nitric acid and sulfuric acid, or sulfuric acid; S2) drying the surface-modified carbon-based material; and S3) preparing a sulfur-carbon composite by compositing the dried surface-modified carbon-based material with sulfur powder, wherein the surface-modified carbon-based material of S1 has a hydroxyl group and a carboxyl group on the surface.

According to the method for preparing a sulfur-carbon composite of the present invention, a surface-modified carbon-based material is readily obtained using a simple process of ultrasonication or heating treatment after loading a carbon-based material in a mixed solution of nitric acid and sulfuric acid, and the method has an advantage in that the surface functional group content may be controlled by adjusting a ratio of the nitric acid and the sulfuric acid in the mixed solution used. The surface-modified carbon-based material prepared as above does not have much changes in the weight, and when preparing a sulfur-carbon composite using the same, polysulfide elution may be suppressed without a separate additive, and therefore, an electrode for a lithium-sulfur battery having large capacity per unit weight may be prepared.

Hereinafter, each step will be described.

(1) Step S1

In Step S1, a carbon-based material is treated with a mixed solution of nitric acid and sulfuric acid so as to have a hydroxyl group and a carboxyl group on the surface.

When a carbon-based material such as carbon powder is treated with an acidic solution and oxidized, a functional group including oxygen, that is, a functional group such as a hydroxyl group or a carboxyl group, is known to be produced on the surface. Such a functional group includes oxygen having unshared electron pairs and is effective in adsorbing polysulfide. Meanwhile, as the content of the functional group including oxygen increases, electrical conductivity of the carbon-based material decreases, and therefore, the functional group content is preferably from 3% to 10% by weight based on the total weight of the carbon-based material in order to secure electrical conductivity of a sulfur-carbon composite while suppressing polysulfide elution.

The inventors of the present invention have modified a surface of a carbon-based material using a mixed solution of nitric acid and sulfuric acid, and as a result, have discovered that a hydroxyl group and a carboxyl group are produced on the surface. As a result, a surface-modified carbon-based material having an excellent polysulfide adsorbing ability may be obtained according to the present invention.

Herein, the used carbon-based material is the same as in the descriptions provided in the sulfur-carbon composite.

As the mixed solution of nitric acid and sulfuric acid, a solution mixing a 70% by weight aqueous nitric acid solution and sulfuric acid in a volume ratio of 1:1 to 0:1 is preferably used, and more preferably, a solution mixing these in 1:3 to 1:9 is used.

Based on the test results obtained by the inventors of the present invention, the surface functional group content increases as the sulfuric acid content increases when the sulfuric acid volume is ¾ or less in the mixed solution, and it was identified that, when the content increases to ¾ or higher, the functional group content decreases again.

A surface functional group including oxygen such as a hydroxyl group and a carboxyl group has a polysulfide adsorbing ability, and therefore, an effect of suppressing polysulfide elution increases as the functional group content increases. However, increasing the functional group content to a certain level or higher has a problem of reducing electrical conductivity as described above. Accordingly, the functional group content of the carbon-based material is preferably from 3% to 10% by weight so as to secure electrical conductivity while exhibiting a polysulfide adsorbing ability, and for this, the mixing ratio of the nitric acid and the sulfuric acid is preferably within the above-mentioned range.

In Step S1, the mixed solution is preferably added in a volume of 50 ml to 150 ml per 1 g of the carbon-based material. When the mixed solvent is added in excess, the carbon-based material has an increased degree of oxidation causing a problem of electrical conductivity decrease, and when the mixed solvent is added in less than the above-mentioned range, the degree of surface modification is insignificant and a polysulfide adsorbing ability may not be expected, and therefore, the content is properly controlled within the above-mentioned range.

Conditions and methods of the mixed solution treatment of the carbon-based material are not particularly limited in the present invention, and for example, ultrasonication or heating treatment may be used. The ultrasonication may be carried out using ultrasonication devices commonly used in the art, and although not particularly limited thereto, the treatment temperature is preferably from 15° C. to 35° C., and preferably room temperature.

In addition, the heating treatment may be carried out in a heat-resistant and pressure resistant vessel such as an autoclave, and the heating temperature is preferably from 90° C. to 120° C. Such a mixed solution treatment is carried out for 30 minutes to 4 hours, and preferably for 1 hour to 3 hours.

In addition, the ultrasonication and the heating treatment may be carried out at the same time, or carried out consecutively such as carrying out the heating treatment after the ultrasonication.

Using the above-mentioned method, the surface-modified carbon-based material has a functional group content of 3% by weight to 10% by weight and more preferably 5% by weight to 10% by weight of the carbon-based material. By having such a functional group content, the surface-modified carbon-based material prepared according to the present invention exhibits excellent electrical conductivity and polysulfide adsorbing ability.

(2) Step S2

Step S2 separates the surface-modified carbon-based material prepared in Step S1 from the solution and dries to prepare the material as a material of a sulfur-carbon composite.

As the method of separating the surface-modified carbon-based material in the solution, methods of filtering and the like may be used. Specifically, a method of dispersing the solution obtained in Step S1 in distilled water for dilution, and vacuum filtering the result using a filter paper or centrifuging the result may be used. By repeating such diluting and filtering processes a few times, the surface-modified carbon-based material is washed.

The method of drying the filtered carbon-based material is not particularly limited in the present invention, and the drying may be carried out under reduced pressure or normal pressure, and at a temperature of 20° C. to 130° C. or lower. Specifically, the drying may be carried out in a vacuum oven at 90° C. to 120° C.

(3) Step S3

Step S3 prepares a sulfur-carbon composite by compositing the surface-modified carbon-based material obtained in Step S2 with sulfur.

Herein, the surface-modified carbon-based material and the sulfur are preferably composited in a weight ratio of 1:1 to 1:9. When the sulfur content is less than the above-mentioned range, the active material amount is insufficient to be used as a positive electrode active material, and when the a carbon-based material content is less than the above-mentioned range, electrical conductivity of the sulfur-carbon composite is not sufficient, and therefore, the content is properly controlled within the above-mentioned range.

The method for preparing a sulfur-carbon composite is not particularly limited, and methods commonly used in the art such as dry composition or wet composition such as spray coating may be used. More specifically, a method of ball milling sulfur powder and the surface-modified carbon-based material for grinding, and then leaving the result for 20 minutes to 1 hour in an oven at 120° C. to 160° C. so that the melted sulfur is evenly coated on the carbon-based material may be used.

The method for preparing a sulfur-carbon composite according to the present invention is economical since the process is simple and high-priced raw materials are not required, and by using a mixed solution of nitric acid and sulfuric acid, only two functional groups of a hydroxyl group and a carboxyl group are introduced to the carbon-based material surface, and as a result, a sulfur-carbon composite having excellent electrical conductivity and polysulfide adsorbing ability may be prepared. In addition, there is an advantage in that the functional group content may be controlled by adjusting just a ratio of the nitric acid and the sulfuric acid without a separate process.

The sulfur-carbon composite prepared as above exhibits excellent electrical conductivity and polysulfide adsorbing ability, and accordingly, is capable of being used as a positive electrode active material for a lithium-sulfur battery.

Electrode for Lithium-Sulfur Battery

An electrode for a lithium-sulfur battery according to the present invention uses the sulfur-carbon composite according to the present invention as an active material. The sulfur-carbon composite includes a surface-modified carbon-based material having a hydroxyl group and a carboxyl group capable of adsorbing polysulfide on the surface, and having electrical conductivity, and therefore, suppresses polysulfide elution while operating a battery. Accordingly, excellent battery capacity and life time properties may be secured when used in a positive electrode of a lithium-sulfur battery.

The electrode for a lithium-sulfur battery includes an active material layer formed on a current collector, and the active material layer includes the sulfur-carbon composite of the present invention, a conductor, a binder and other additives.

The electrode current collector performs a role of a passage delivering electrons from the outside so that an electrochemical reaction occurs in an active material or receiving electrons from an active material and flowing the electrons outwards, and is not particularly limited as long as it has conductivity without inducing chemical changes in the corresponding battery. Examples thereof may include copper, stainless steel, aluminum, nickel, titanium, baked carbon, copper or stainless steel of which surface is treated with carbon, nickel, titanium, silver or the like, aluminum-cadmium alloys, or the like. In addition, the electrode current collector forms fine unevenness on the surface to increase adhesive strength of the active material, and various forms such as films, sheets, foil, nets, porous bodies, foams and non-woven fabrics may be used.

The conductor is not particularly limited as long as it has conductivity without inducing chemical changes in the corresponding battery, and examples thereof may include graphite such as natural graphite or artificial graphite; carbon black such as carbon black, acetylene black, ketjen black, denka black, channel black, furnace black, lamp black and thermal black; graphene; conductive polymers such as carbon fibers including carbon nanotubes (CNT), carbon nanofibers (CNF) and the like, or metal fibers; metal powders such as fluorocarbon, aluminum and nickel powder; conductive whiskers such as zinc oxide and potassium titanate; conductive metal oxides such as titanium oxide; polyphenylene derivatives, and the like.

The binder is added for binding the active material and the conductor, or binding the active material and the current collector, and may be a thermoplastic resin or a thermosetting resin. As examples of the binder, polyethylene, polypropylene, polytetrafluoroethylene (PTFE), polyvinylidene fluoride (PVDF), styrene-butadiene rubber (SBR), a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer, polyvinyl alcohol (PVA), polyacrylic acid (PAA), polymethacrylic acid (PMA), polymethyl methacrylate (PMMA) polyacrylamide (PAM), polymethacrylamide, polyacrylonitrile (PAN), polymethacrylonitrile, polyimide (PI), alginic acid, alginate, chitosan, carboxymethylcellulose (CMC), starch, hydroxypropylcellulose, regenerated cellulose, polyvinyl pyrrolidone and the like may be used either alone or as a mixture thereof, however, the binder is not limited thereto, and those capable of being used as a binder in the art may all be used.

The electrode for a lithium-sulfur battery of the present invention may be prepared using common methods, and specifically, may be prepared by coating a composition for forming an active material layer prepared by mixing the sulfur-carbon composite of the present invention, which is an active material, the conductor and the binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, N-methyl-2-pyrrolidone, acetonitrile, methanol, ethanol, tetrahydrofuran, water, isopropyl alcohol and the like may be included.

Lithium-Sulfur Battery

A lithium-sulfur battery according to the present invention includes a positive electrode, a negative electrode, and a liquid electrolyte present therebetween, and the electrode for a lithium-sulfur battery according to the present invention is used as the positive electrode. Herein, the battery may further include a separator provided between the positive electrode and the negative electrode.

In the lithium-sulfur battery according to the present invention, a problem of polysulfide elution of a positive electrode is improved, and an excellent life time property is obtained.

Constitutions of the negative electrode, the separator and the liquid electrolyte of the lithium-sulfur battery are not particularly limited in the present invention, and follow known constitutions in the art.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, the negative electrode may be lithium metal or a lithium alloy. As nonlimiting examples, the negative electrode may be a thin film of lithium metal, or an alloy of lithium and one or more types of metals selected from the group consisting of Na, K, Rb, Cs, Fr, Be, Mg, Ca, Sr, Ba, Ra, Al and Sn.

Separator

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the liquid electrolyte are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

Liquid Electrolyte

The liquid electrolyte according to the present invention is a non-aqueous liquid electrolyte, and is formed with a lithium salt and a solvent. As the solvent, a non-aqueous organic solvent, an organic solid electrolyte, an inorganic solid electrolyte and the like are used.

The lithium salt of the present invention is a material readily dissolved in a non-aqueous organic solvent, and examples thereof may include one or more selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, chloroborane lithium, lower aliphatic carboxylic acid lithium, lithium tetraphenylborate and imide.

The concentration of the lithium salt may be from 0.1 M to 4.0 M, and preferably from 0.5 M to 2.0 M depending on various factors such as an accurate composition of the liquid electrolyte mixture, solubility of the salt, conductivity of the dissolved salt, charge and discharge conditions of a battery, a working temperature, and other factors known in the lithium-sulfur battery field. When the lithium salt concentration is less than the above-mentioned range, conductivity of the liquid electrolyte may decrease causing decline in the battery performance, and when the lithium salt concentration is greater than the above-mentioned range, viscosity of the liquid electrolyte increases leading to a decrease in the lithium ion (Li$^+$) mobility, and therefore, it is preferred that a proper concentration is selected within the above-mentioned range.

The non-aqueous organic solvent needs to favorably dissolve the lithium salt, and preferably, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, diethylene glycol dimethyl ether, triethylene glycol dimethyl ether, tetraethylene glycol dimethyl ether, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or in a mixed solution form of two or more organic solvents.

As the organic solid electrolyte, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be preferably used.

As the inorganic solid electrolyte of the present invention, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH or Li$_3$PO$_4$—Li$_2$S—SiS$_2$ may be preferably used.

The non-aqueous liquid electrolyte for a lithium-sulfur battery of the present invention may further include a nitrate or nitrite-based compound as an additive. The nitrate or nitrite-based compound is effective in forming a stable film in a lithium electrode and greatly enhancing charge and discharge efficiency. Such a nitrate or nitrite-based compound is not particularly limited in the present invention, and one type selected from the group consisting of inorganic nitrate or nitrite compounds such as lithium nitrate (LiNO$_3$), potassium nitrate (KNO$_3$), cesium nitrate (CsNO$_3$), barium nitrate (Ba(NO$_3$)$_2$), ammonium nitrate (NH$_4$NO$_3$) lithium nitrite (LiNO$_2$), potassium nitrite (KNO$_2$), cesium nitrite (CsNO$_2$) or ammonium nitrite (NH$_4$NO$_2$); organic nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite or octyl nitrite; organic nitro compounds such as nitromethane, nitropropane, nitrobutane, nitrobenzene, dinitrobenzene, nitropyridine, dinitropyridine, nitrotoluene or dinitrotoluene, and combinations thereof may be used, and preferably, lithium nitrate may be used.

In addition, the non-aqueous liquid electrolyte may further include other additives with the purpose of improving charge and discharge properties and flame retardancy. Examples of the additives may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

The positive electrode, the negative electrode and the separator included in the lithium-sulfur battery may each be prepared using common components and preparation methods, and although not particularly limited thereto, appearances of the lithium-sulfur battery may include a cylinder-type, a square-type, a pouch-type, a coin-type and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Example 1: Preparation of Sulfur-Carbon Composite

A mixed solution in which 250 ml of a 70% (weight %) aqueous nitric acid solution and 250 ml of sulfuric acid were added to 5 g of carbon nanotubes (CNT) was placed in a CPX8800H-E bath sonicator manufactured by Branson, and ultrasonicated (40 kHz, 280 W) for 2 hours at room temperature (25° C.), and then dried in a vacuum oven at 110° C. to obtain surface-modified CNT.

After mixing 3 g of the surface-modified CNT with 7 g of sulfur (S8), the result was crushed through ball milling, and then left for 30 minutes in an oven at 155° C. to prepare a sulfur-carbon composite.

Example 2: Preparation of Sulfur-Carbon Composite

A sulfur-carbon composite was prepared in the same manner as in Example 1 except that a mixed solution of 125 ml of a 70% aqueous nitric acid solution and 375 ml of sulfuric acid was used.

Example 3: Preparation of Sulfur-Carbon Composite

A sulfur-carbon composite was prepared in the same manner as in Example 1 except that a mixed solution of 50 ml of a 70% aqueous nitric acid solution and 450 ml of sulfuric acid was used.

Example 4: Preparation of Sulfur-Carbon Composite

A sulfur-carbon composite was prepared in the same manner as in Example 1 except that 500 ml of sulfuric acid was used.

Comparative Example 1: Preparation of Sulfur-Carbon Composite

After mixing 3 g of carbon nanotubes that were not acid treated with 7 g of sulfur (S8), the result was crushed through ball milling, and then left for 30 minutes in an oven at 155° C. to prepare a sulfur-carbon composite.

Comparative Example 2: Preparation of Sulfur-Carbon Composite

A sulfur-carbon composite was prepared in the same manner as in Example 1 except that 500 ml of a 70% aqueous nitric acid solution was used.

Preparation Example 1: Preparation of Electrode for Lithium-Sulfur Battery and Manufacture of Lithium-Sulfur Battery An electrode for a lithium-sulfur battery was prepared as follows using each of the sulfur-carbon composites of Examples 2 to 4, and Comparative Examples 1 and 2, and a lithium-sulfur battery employing this as a positive electrode was manufactured.

(1) Preparation of Electrode 0.2 g of a conductor (denka black) and 5 g of carboxymethylcellulose (CMC) were introduced and mixed with a zirconia ball. Then, 3.6 g of the sulfur-carbon composite and a fixed quantity of water were introduced thereto, and the result was mixed again. Lastly, 0.35 g of styrene-butadiene rubber (SBR) was added thereto, and the result was mixed again to prepare slurry.

The prepared slurry was poured on aluminum foil and coated to a thickness of 200 μm using a blade coater, and the result was dried in an oven at 50° C. to prepare an electrode for a lithium-sulfur battery.

(2) Manufacture of Battery

The electrode prepared in (1) was stamped to fit a coin cell size to manufacture a coin cell battery employing this as a positive electrode.

In a glove box under argon atmosphere, the positive electrode, a separator (polyethylene), a lithium negative electrode, a gasket, a stainless steel coin, a spring and a stainless steel upper plate were consecutively placed on a stainless steel lower plate, and a pressure was applied thereto to assemble a coin cell.

As a liquid electrolyte, a 1 M LiFSI 1 wt % $LiNO_3$-dissolved mixed solution of 1,3-dioxolane (DOL):diethylene glycol dimethyl ether (DEGDME)=4:6 (v/v) was injected on the stamped positive electrode to be used.

Experimental Example 1: Structural Analysis on Surface-Modified Carbon Nanotubes (CNT)

(1) SEM Analysis

The structures of the CNT before and after the surface modification were compared using a scanning electron microscope (SEM). When referring to FIG. 1, it was identified that the CNT did not experience much changes in the secondary structure and the like even after the surface treatment.

(2) Infrared Spectroscopy (FT-IR) Analysis

In order to identify that the CNT of Comparative Example 2 and Examples 1 to 4 had their surfaces modified after the acid solution treatment, an infrared spectroscopy method was performed. As a result, —OH ($3500\ cm^{-1}$ to $3000\ cm^{-1}$) and —COOH (C=O: $1750\ cm^{-1}$, C—O ($1050\ cm^{-1}$)) peaks were observed after the acid treatment, and functionalization of the CNT surface was identified therefrom.

(3) Analysis on CNT Functional Group Content

The functional group content of the surface-treated CNT of Comparative Example 2 and Examples 1 to 4, which were acid treated while varying a ratio of nitric acid and sulfuric acid, was analyzed by thermogravimetric analysis (TGA). The thermogravimetric analysis was performed under nitrogen atmosphere to prevent carbon oxidation. The weight decrement was measured up to 600° C. since the functional groups attached on the surface are detached or pyrolyzed at 500° C. to 600° C.

The graph of thermogravimetric analysis is shown in FIG. 2. Based on the test results, the surface functional group content was 1.7% by weight in Comparative Example 2, 4.7% by weight in Example 1, 9.4% by weight in Example 2, 7.3% by weight in Example 3, and 3.1% by weight in Example 4. In other words, it was identified that, while the ratio (volume ratio) of sulfuric acid increased from 0 to ¾ in the surface modification solution, the functional group content tended to increase as the sulfuric acid content increased, however, the degree of surface modification decreased again when the ratio was greater than ¾.

Experimental Example 2: Evaluation on Battery Performance

Performance of the battery manufactured in Preparation Example 1 was evaluated. Battery performance was evaluated up to 50 cycles at a rate of 0.1 C for 2.5 cycles of initial discharge-charge-discharge-charge-discharge, and then at a rate of 0.3 C for charge and a rate of 0.5 C for discharge thereafter.

The results are shown in the following Table 1, FIG. 3 and FIG. 4.

TABLE 1

|  | Comparative Example 1 | Comparative Example 2 | Example 2 | Example 3 | Example 4 |
|---|---|---|---|---|---|
| Surface Functional Group Content (wt %) | <1 | 1.7 | 9.4 | 7.3 | 3.1 |
| Initial Discharge Capacity (0.1 C, mAh/g) | 1086 | 741 | 1349 | 1113 | 1090 |

Based on the test results, initial discharge capacity of Examples 2 to 4 having a surface functional group content of 3.1% by weight or greater was turned out to be excellent compared to Comparative Example 1 with no surface modification, and it was identified that the higher the functional group content, the greater the initial discharge capacity.

In addition, when referring to the charge and discharge curves of FIG. 3, it was seen that, in Examples 2 to 4 having a surface functional group content of 3% by weight or greater, the second potential plateau (voltage plateau) at which eluting polysulfide was reduced again to $Li_2S$ increased. When comparing the degree of increase in the potential plateau, it was identified that an intermediate produced was capable of being efficiently converted to a final product as the degree of surface modification increased, and capacity properties were enhanced therefrom.

Meanwhile, when measuring non-discharge capacity while progressing 50 cycles for the battery of Example 2 having a surface functional group of 9.4% by weight (FIG. 4), it was identified that an excellent capacity retention rate was obtained compared to Comparative Example 1. This may be due to the fact that polysulfide elution was suppressed by the surface-modified carbon-based material, and the content of sulfur, an active material in the positive electrode, was maintained at a high level even with repeated charge and discharge.

In the evaluation on battery performance, Comparative Example 2 having a surface functional group content of 1.7% by weight also exhibited declined battery performance compared to Comparative Example 1 with no surface modification. However, it was seen that, as the surface functional group content reached 3% by weight or greater, battery performance was significantly enhanced, and very excellent discharge capacity and cycle properties were exhibited up to 10% by weight.

As is identified from the experimental examples, the carbon-based material includes a hydroxyl group and a carboxyl group in 3% to 10% by weight in the sulfur-carbon composite of the present invention, and as a result, an excellent polysulfide adsorbing ability is obtained, and battery life properties may be enhanced when using the sulfur-carbon composite as a positive electrode active material of a lithium-sulfur battery.

The invention claimed is:

1. A lithium-sulfur battery comprising:
   a positive electrode comprising a sulfur-carbon composite as an active material;
   a negative electrode; and
   an electrolyte present therebetween,
   wherein the sulfur-carbon composite, comprises:
      a carbon-based material, wherein a surface of the carbon-based material is modified with a hydroxyl group and a carboxyl group; and
      sulfur,
   wherein the hydroxyl group and the carboxyl group are included in an amount of 7.3% to 10% by weight based on the total weight of the carbon-based material, and the sulfur-carbon composite has a core-shell structured coating form or a loaded form, wherein if the sulfur-carbon composite has a core-shell structured coating form, then the carbon-based material coats the sulfur, and
   wherein if the sulfur-carbon composite has a loaded form, then the carbon-based material is porous, and the sulfur is loaded inside the carbon-based material.

2. The lithium-sulfur battery of claim 1, wherein the carbon-based material is at least one selected from the group consisting of carbon nanotubes, graphene, graphite, amorphous carbon, carbon black and active carbon.

3. The lithium-sulfur battery of claim 1, wherein, in the sulfur-carbon composite, a ratio of the carbon-based material and the sulfur is from 1:1 to 1:9.

4. The lithium-sulfur battery of claim 1, wherein the sulfur-carbon composite has a diameter of 0.1 µm to 20 µm.

5. A method for preparing the sulfur carbon composite the lithium-sulfur battery according to claim 1, comprising assembling the positive electrode comprising the sulfur-carbon composite as an active material, the negative electrode and the electrolyte;
   wherein the sulfur-carbon composite is prepared by:
   S1) preparing a surface-modified carbon-based material by treating the carbon-based material with a mixed solution of nitric acid and sulfuric acid, or sulfuric acid under ultrasonication conditions;
   S2) drying the surface-modified carbon-based material; and
   S3) preparing the sulfur-carbon composite by compositing the dried surface-modified carbon-based material with sulfur ($S_8$) powder by ball mixing,
   wherein the surface-modified carbon-based material of S1 has the hydroxyl group and the carboxyl group on the surface thereof in an amount of 7.3% to 10% by weight based on the total weight of the carbon-based material.

6. The method according to claim 5, wherein the mixed solution of S1 is a solution prepared by mixing a 70% by weight aqueous nitric acid solution and sulfuric acid in a volume ratio of 1:1 to 0:1.

7. The method according to claim 6, wherein in S1, the mixed solution is added in 50 ml to 150 ml per 1 g of the carbon-based material.

8. The method according to claim 5, wherein S1 includes ultrasonication at room temperature.

9. The method according to claim 5, wherein S1 includes heating at a temperature of 90° C. to 120° C.

* * * * *